INVENTORS
YNGVE SVENSSON & ERIK NILSSON
BY Harry Ernest Rubens
ATTORNEY.

Patented Feb. 14, 1950

2,497,478

UNITED STATES PATENT OFFICE 2,497,478

DRIVING MECHANISM FOR MULTIPLEX CAMERAS

Yngve Svensson and Erik Nilsson, Goteborg, Sweden

Application May 7, 1946, Serial No. 667,948
In Sweden March 2, 1945

2 Claims. (Cl. 95—37)

The present invention refers to the driving mechanism for multiplex cameras, viz. such cameras which are adapted for taking series of portraits on one and the same plate that is given an intermittent movement in the vertical as well as in the horizontal direction. Usually this changing of the plate into different positions has been effected by hand by means of a crank driven mechanism, the photographer manually exposing the plate.

The main object of the invention is to remove the inconvenience of a manually driven mechanism and replace the same by a motor driven one.

Another object of the invention is to insert a driving gear between a motor and the existing manually driven mechanism so that this can be maintained.

A further object of the invention is to couple an intermediate driving gear between a motor and the existing mechanism in such a way that the plate changing mechanism can be driven alternately by the motor or by the crank.

Other objects will appear hereinafter.

The invention consists in that a disconnectable friction gear is coupled between the motor and the crankshaft and in order to make it possible to free-couple the whole transmission gear between the motor and the crankshaft the one friction wheel preferably is placed on the crankshaft. When using an electric motor a certain novel time switch is used to periodically connect and disconnect the current as well as to reverse the same.

The invention will be best understood by reference to the accompanying drawing, showing the preferred form of construction and in which.

Figure 1:
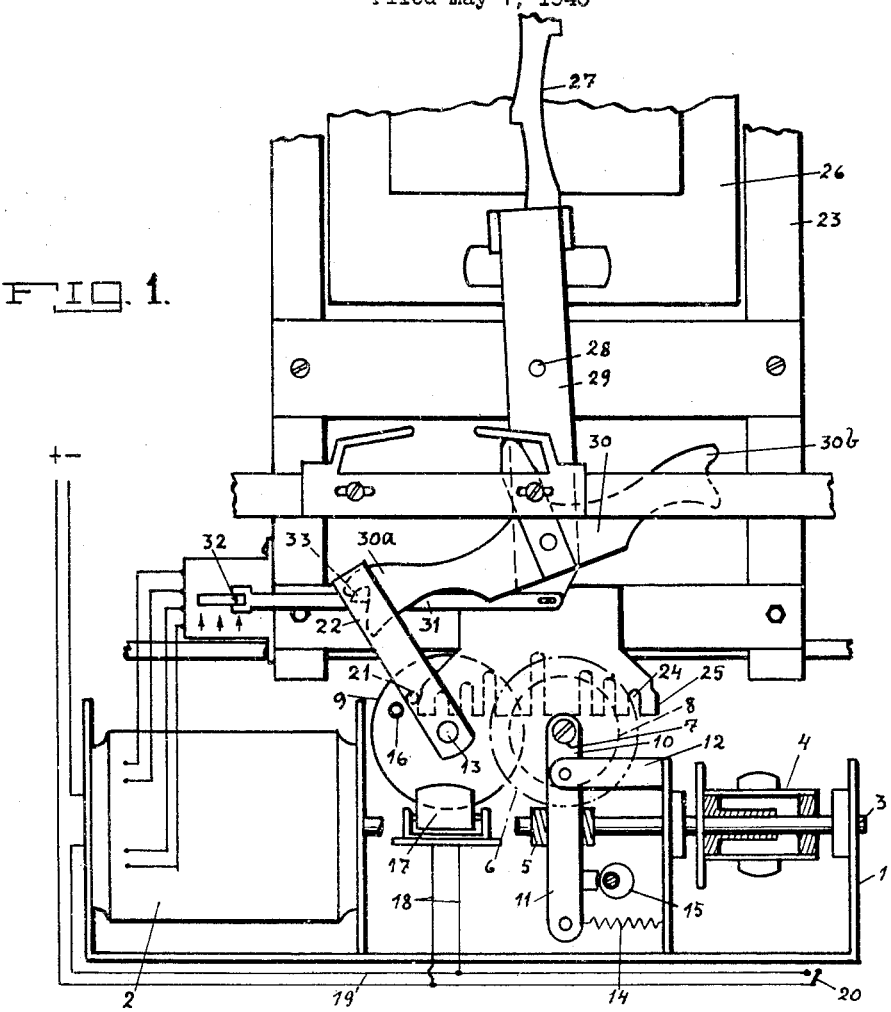
Fig. 1 is an elevation view of the camera driving mechanism.
Figure 2:
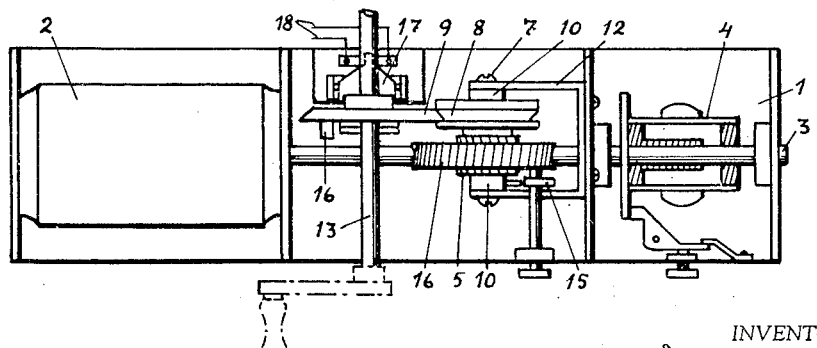
Fig. 2 is a plan view thereof.

On a metal plate 1 shaped to be mounted into the camera frame without disturbing a possibly existing mechanism there is arranged an electric motor 2 with an elongated shaft 3, preferably provided with a speed governor 4 for instance of the type used in gramophones or such like. The shaft is provided with a screw 5 in coaction with a worm-wheel 6, fixed to a crossing axle 7 having a friction wheel 8 in co-operation with a friction wheel 9, fastened to a crankshaft 13 by means of which the camera plate holder can be manually shifted to different positions by a mechanism of known construction. The axle 7 is turnable in bearings on a two-armed lever 10, 11, swingably mounted on a support 12. The one arm 10 of the lever carries the axle 7 with the worm-wheel and the friction wheel 8, and a spring 14 acts upon the other arm 11 of the lever in such a way that the friction wheel 8 is pressed against the friction wheel 9. The arm 11 is further governed by a manually turnable eccentric 15, which when desired can press the arm into a position where the friction wheel 8 is disconnected from the friction wheel 9. The latter, fixed to the crankshaft 13, is provided with a projection 16, that coacts with a switch 17, which is inserted in a branch line 18 from the current head lines 19 of the motor, the head lines being provided with a head switch 20.

The manually operated mechanism, shown in the drawing, for the stepwise shifting of the position of the plate holder 26 consists of a comb 25, fastened to a horizontally movable frame 23, and provided with vertical tooth spaces 24, into which a pin 21, on a radial arm 22, on the crankshaft 13, will alternately slide when the crankshaft is turned, thus driving the frame stepwise in the horizontal direction. The plate holder 26, arranged to be able to slide downwards in the frame 23, is supported by a ratchet rod 27 which is step-wise caused to fall downwards by a gang hook 29, swingably mounted on a pinion 28. In the construction shown the pin 21 will coact with the tooth spaces 24 next to the middle one on each side thereof. When the wheel 9 is turned counterclockwise the pin 21 will grip into the tooth space 24 next to the middle one and draw the comb to the left a distance corresponding to the breadth of a picture section. When the pin then leaves the tooth space said section remains still for exposure, and when the wheel rotation proceeds the pin will grip into another tooth space to repeat the drawing action on the comb until the horizontal picture row is finished. In the drawing the comb has been provided with several tooth spaces not used for this special movement. This design is made in order to make it possible for the comb to be used for different numbers of picture sections on the horizontal row provided that the pin 21 is adjusted accordingly.

The gang hook 29 is operated by means of a two-armed balance 30, 30a, 30b on a pinion attached to the gang hook which balance during the horizontal movement of the frame will swing into operating positions. When a horizontal picture row is exposed the balance will reach the one end position and a projection 33 of the radial arm 22 will knock against the end of the balance and in this manner somewhat displace the gang hook which causes the ratchet rod with the plate holder to fall down one step bringing the next horizontal picture row in position. At the same time the balance will prevent the radial arm 22 from being turned further in the same direction.

According to this invention a rod 31 is connected to the gang hook 29 or to a member cooperating therewith, the rod being arranged to operate a current reversing switch 32. This switch, which can be of a known construction, has two end positions in which the current reversing is obtained, and one intermediate position wherein the current is shut off.

In the position shown in Fig. 1 a horizontal picture row just has been exposed and the plate has fallen down bringing the next horizontal row and the first left section thereof in position to be exposed. The switch 32 has been switched over to the right and the current to the motor has been reversed so that the rotation direction is reversed and the crankshaft 13 now will turn counter-clockwise. The rotation of the motor is transmitted through its shaft 3 and screw 5 to the worm wheel 6 and friction wheel 8 of the crossing axle 7, the friction wheel 8, on account of the spring pressure, being pressed against the friction wheel 9, on the crankshaft 13, the latter being turned in the said direction. The head switch 20 is open but the switch 17 is automatically held shut for instance by means of a spring.

At the turning movement of the crankshaft 13, the shutter of the camera is set and released in known manner. When the crankshaft is turned about a third of a revolution from its initial position, the shutter is set but before the same is released, the projection 16 on the friction wheel 9 strikes against the switch 17, so that this is opened, the current shut off and the turning movement stopped. The photographer now waits until the sitter has placed himself in the right position, and then closes the head switch 20, so that the crankshaft again is turned with the result that the shutter is released (opened and shut) and the switch 17 closed. The picture section now is exposed and the head switch 20 will again be reopened by the photographer.

During the remaining two thirds of the revolution the driving pin 21 enters one of the tooth spaces 24 in the comb 25, and pushes the plate holder one step in the horizontal direction so that the next section is placed in front of the shutter. When the pin 21 leaves the comb, the crankshaft has turned one revolution. During the next revolution the same operations are carried through and the plate holder is moved a further step in the same way as before.

When all the sections in the row are exposed, the balance 30 is swung into such a position that its other arm 30b is blocking the projection 33 of the radial arm 22, the pressing of which on the balance displaces the gang hook 29, so that the ratchet rod 27 is freed and falls down one step, bringing the next picture row in position. At the same time the rod 31 is moved by the gang hook 29, so that the switch 32 is switched to the other end position reversing the current and thus the motor rotation direction on account of which the plate holder now is stepwise shifted horizontally in the opposite direction, and the picture sections will be exposed in the same way as before but in reversed order.

The upper portion of the ratchet rod 27 is shaped in such a way that the radial arm 22 cannot displace the gang hook 29 more than half of the usual way when the last horizontal row is exposed and the plate thus finished. The result will be that the switch 32 will stop in the middle position and the current automatically shut off.

In cameras now in use it is possible to use plates for different numbers of pictures in adjusting the driving pin 21 on the radial arm 22, and the displacement of the gang hook 29 against ratchet rods 27 of different designs. In changing of these parts as well as at the coupling of the comb to the driving pin ignorance and carelessness can cause many erroneous assemblings of the parts with the result that the rotation will stop short. The provision of the friction gear therefore is of vital importance as breaking of the parts will be prevented by the slipping of the friction wheels against each other regulated by the tension of the spring. The easy disconnection of the friction wheels is also of great value, as the motor and the transmission gears can be put out of action by a motor defect, short circuit, or such like, and the camera mechanism can be driven by a handle crank on the shaft 13 shown with dotted lines in Fig. 1.

Obviously the arrangement is capable of much modification and we do not wish to be limited except as indicated in the appended claims.

We claim:

1. In a multiplex camera a mechanism to shift the camera plate holder horizontally and vertically to different positions in order to expose a number of pictures on the same plate, the mechanism consisting of a frame guiding the plate holder and movable horizontally, the plate holder vertically slideable therein, a ratchet rod attached to the plate holder and carrying the same, a gang hook swingably mounted to the frame and in engagement with the ratchet rod, the displacement of the gang hook causing the ratchet rod with the plate holder to fall one step at the end of the horizontal movement of the frame, a comb attached to the frame, a crankshaft to drive said mechanism and coacting with the camera shutter to release the same once per revolution, a member rotating with the crankshaft and provided with an axially projecting pin to grip into alternate tooth spaces of the comb to displace the same with the frame and the plate holder horizontally one step per revolution of the crank shaft, an electric motor to drive the crankshaft, a friction gear inserted between the motor and the crankshaft, the member of the crankshaft provided with a projection in intermittent cooperation with a switch to break the current to the motor once per revolution of the crankshaft, a head switch to reclose the current to the motor and restart the rotation of the crankshaft, a switch connected to the gang hook and following the movement of the same to reverse the current to the motor at the end of the horizontal movement of the frame, means to disengage the crankshaft from the members driving the same, the motor and the between-coupled crankshaft driving members being executed as a separate mechanism carried by a foot plate and mountable as a separate unit into the camera.

2. In a multiplex camera a mechanism to shift the camera plate holder horizontally and vertically to different positions in order to expose a number of pictures on the same plate, the mechanism consisting of a frame guiding the plate holder and movable horizontally, the plate holder vertically slideable therein, a ratchet rod attached to the plate holder and carrying the same, a gang hook swingably mounted to the frame and in engagement with a ratchet rod, the displacement of the gang hook causing the ratchet rod with the plate holder to fall one step at the end of the horizontal movement of the frame, a comb attached to the frame, a crankshaft to drive said mechanism and coacting with the camera shutter to release the same once per revolution, a member rotating with the crankshaft and provided with an axially projecting pin to grip into alternate tooth spaces of the comb to displace the same with the frame and the plate holder horizontally one step per revolution of the crankshaft, an electric motor to drive the crankshaft, a friction gear inserted between the motor and the crankshaft, the member of the crankshaft provided with a projection in intermittent co-operation with a switch to break the current to the motor once per revolution of the crankshaft, a head switch to reclose the current to the motor and restart the rotation to the crankshaft, a switch connected to the gang hook and following the movement of the same to reverse the current to the motor at the end of the horizontal movement of the frame, the driving friction wheel of the friction gear attached to a worm wheel concentric therewith, the worm wheel in co-operation with a screw fixed to the motor shaft, the driving friction wheel and the worm wheel carried by bearings displaceable in the direction of the motor shaft to disconnect the friction wheels from each other, the motor and the between-coupled crankshaft driving members being executed as a separate mechanism carried by a foot plate and mountable as a separate unit into the camera.

YNGVE SVENSSON.
ERIK NILSSON.

REFERENCES CITED

The following references are of record in the file of this patent:

UNITED STATES PATENTS

| Number | Name | Date |
|---|---|---|
| 780,382 | Reavill | Jan. 17, 1905 |
| 2,125,388 | Monroe | Aug. 2, 1938 |
| 2,260,561 | Cuendet | Oct. 28, 1941 |
| 2,369,981 | Reyniers | Feb. 20, 1945 |